United States Patent
Connell

(10) Patent No.: US 7,237,809 B2
(45) Date of Patent: Jul. 3, 2007

(54) COILED TUBING CONNECTOR

(75) Inventor: Michael L. Connell, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 15 days.

(21) Appl. No.: 10/841,067

(22) Filed: May 7, 2004

(65) Prior Publication Data

US 2005/0248151 A1 Nov. 10, 2005

(51) Int. Cl.
- F16L 33/00 (2006.01)
- F16L 13/14 (2006.01)
- B21D 39/00 (2006.01)

(52) U.S. Cl. .................. 285/382; 285/382.2; 285/256; 29/508

(58) Field of Classification Search ................ 285/256, 285/259, 382, 382.1, 382.2, 148.13, 148.16, 285/148.17; 29/508, 515
See application file for complete search history.

(56) References Cited

U.S. PATENT DOCUMENTS

| | | | | |
|---|---|---|---|---|
| 587,695 A | * | 8/1897 | Billing et al. | 285/114 |
| 1,785,638 A | * | 12/1930 | Ludwig | 285/114 |
| 1,995,616 A | * | 3/1935 | Kamack | 285/289.3 |
| 3,068,563 A | * | 12/1962 | Reverman | 29/458 |
| 3,745,644 A | * | 7/1973 | Moyer et al. | 29/515 |
| 3,895,177 A | * | 7/1975 | Muslin | 174/48 |
| 4,277,091 A | * | 7/1981 | Hunter | 285/55 |
| 4,902,048 A | * | 2/1990 | Washizu | 285/319 |
| 5,326,137 A | * | 7/1994 | Lorenz et al. | 285/55 |
| 5,378,023 A | * | 1/1995 | Olbrich | 285/24 |
| 5,829,795 A | * | 11/1998 | Riesselmann | 285/256 |
| 6,059,338 A | * | 5/2000 | Diederichs | 285/55 |
| 6,070,915 A | * | 6/2000 | Luo | 285/125.1 |
| 6,082,784 A | * | 7/2000 | Fukaya | 285/382 |
| 6,131,953 A | | 10/2000 | Connell et al. | |
| 6,186,559 B1 | * | 2/2001 | Fisher et al. | 285/256 |
| 6,264,244 B1 | | 7/2001 | Isennock et al. | |
| 6,367,557 B1 | | 4/2002 | Rosine et al. | |
| 6,474,701 B1 | | 11/2002 | Bowles et al. | |
| 2003/0080558 A1 | * | 5/2003 | Villano et al. | 285/256 |
| 2004/0227344 A1 | * | 11/2004 | Lin | 285/256 |

OTHER PUBLICATIONS

BD Kendle Engineering Limited; "Coiled Tubing Tools—Section 3: Inline Connectors"; printed Mar. 23, 2004, www.bdkendle.co.uk/Coiled_Tubing.

* cited by examiner

*Primary Examiner*—James M. Hewitt
(74) *Attorney, Agent, or Firm*—John W. Wustenberg; Conley Rose, P.C.

(57) ABSTRACT

A tubing connector comprising a rigid member having a first end and a second end; a crimping groove disposed about the rigid member; and a sleeve fixably attached to the rigid member and covering the crimping groove. A method for connecting a tubing section to a rigid member, the method comprising fixably attaching a sleeve over one end of the rigid member to cover a crimping groove disposed on the rigid member, disposing the tubing section over the sleeve, and plastically deforming the tubing section and sleeve to form a plurality of dimples that project into the crimping groove of the rigid member.

18 Claims, 2 Drawing Sheets

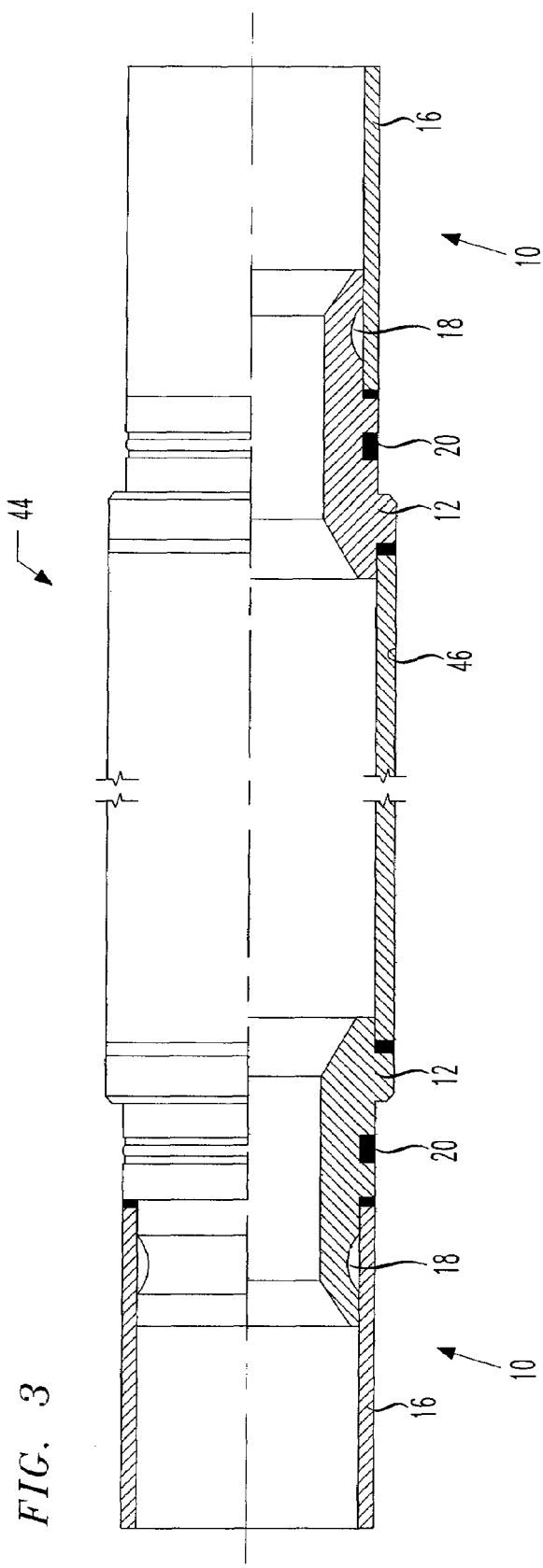

COILED TUBING CONNECTOR

BACKGROUND

The present invention relates generally to methods and apparatus for connecting lengths of coiled tubing. More particularly, the present invention relates to spoolable coiled tubing connectors that maintain the pressure and tensile strength ratings of the tubing.

Conventional tubing strings are constructed in thirty foot long straight sections that are connected in series. A coiled tubing string generally includes a continuous length of small diameter tubing that is much more flexible than conventional tubing and can therefore be spooled onto a reel. The coiled tubing is unwound from the reel and directed over a gooseneck and through a tubing injector head into a wellbore. Coiled tubing is used for a variety of wellbore processes, including injecting gas or other fluids into the wellbore, inflating or activating bridge plugs and packers, transporting well logging tools downhole, performing remedial cementing and clean-out operations in the wellbore, and delivering or retrieving drilling tools downhole.

As the utilization of coiled tubing expands into applications involving greater depths, pressures, and more remote operating locations, the complexity and size of a coiled tubing system increase. Transportation and handling constraints often limit the size of the reel and the corresponding length of coiled tubing able to be stored on a given reel. To overcome this limitation, lengths of coiled tubing from multiple reels can be connected in series and used in a single operation. These multiple lengths can then be spooled back onto a single, larger reel for more efficient storage. Although lengths of coiled tubing can be welded together, welding requires special equipment, personnel, and a closely controlled environment. In connecting lengths of coiled tubing, a mechanical connector that does not require welding at a well site can simplify the connection process by enabling faster connections in a wider variety of environmental conditions.

In operation, coiled tubing is subjected to bending stresses both when being spooled onto and off of the reel and when being fed over the gooseneck into the injector head. A mechanical connector joining lengths of coiled tubing will also be subjected to these bending stresses. As the length and stiffness of a connector increase, areas of stress concentration will develop in the regions of the coiled tubing immediately adjacent to the connector. Therefore, it is desirable to minimize both the overall length and stiffness of a coiled tubing connector.

Thus, there remains a need to develop methods and apparatus for connecting lengths of coiled tubing, which overcome some of the foregoing difficulties while providing more advantageous overall results.

SUMMARY

Disclosed herein is a tubing connector comprising a rigid member having a first end and a second end, a crimping groove disposed about the rigid member, and a sleeve fixably attached to the rigid member and covering the crimping groove.

Further disclosed herein is a method for connecting a tubing section to a rigid member, the method comprising fixably attaching a sleeve over one end of the rigid member to cover a crimping groove disposed on the rigid member, disposing the tubing section over the sleeve, and plastically deforming the tubing section and sleeve to form a plurality of dimples in that project into the crimping groove of the rigid member.

Further disclosed herein is a spoolable tubing connector comprising a flexible tubing section having first and second ends, a first rigid member fixably attached to the first end of the flexible tubing member, the first rigid member comprising at least one crimping groove, a first sleeve fixably attached to the first rigid member, wherein the first sleeve covers the crimping groove on the first rigid member, a second rigid member fixably attached to the second end of the flexible tubing member, the second rigid member comprising at least one crimping groove, and a second sleeve fixably attached to the second rigid member, wherein the second sleeve covers the crimping groove on the second rigid member.

Thus, the present invention comprises a combination of features and advantages that enable it to overcome various problems of prior devices. The various characteristics described above, as well as other features, will be readily apparent to those skilled in the art upon reading the following detailed description of the following embodiments of the invention, and by referring to the accompanying drawings.

BRIEF DESCRIPTION OF THE DRAWINGS

For a more detailed description of representative embodiments of the present invention, reference will now be made to the accompanying drawings, wherein:

FIG. 3 is a partial sectional view of a double ended coiled tubing connector; and FIG. 4 is a partial sectional view of a coiled tubing connector.

DETAILED DESCRIPTION

Figure 1:
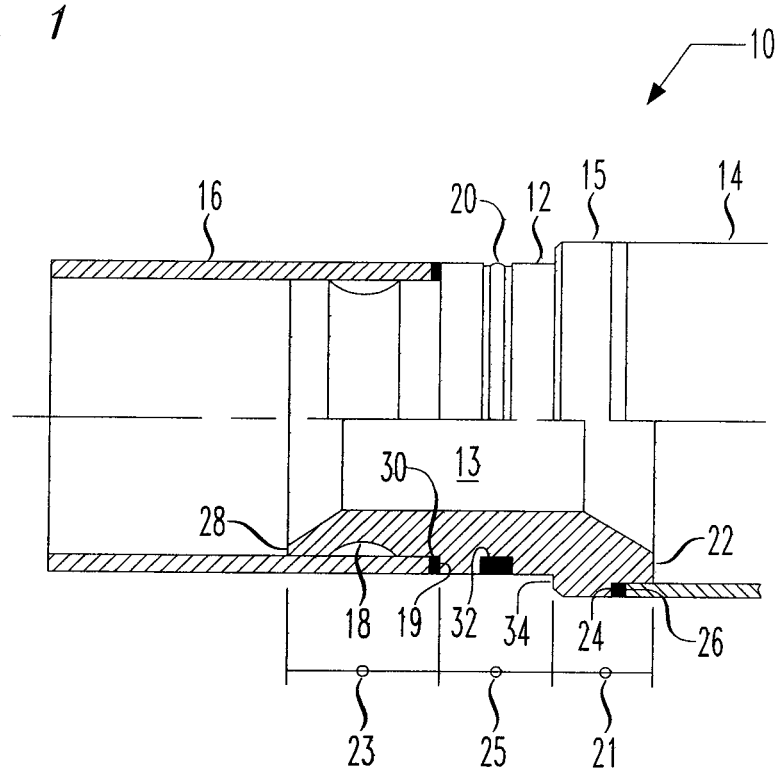
FIG. 1 is a partial sectional view of a coiled tubing connector.

Referring now to FIG. 1, a coiled tubing connector 10 is shown comprising a rigid member 12, first tubing section 14, sleeve 16, and seal 20. Rigid member 12 is a tubular member having an inner diameter defining an axial flow passage 13 and a maximum outer diameter 15 that is closely matched to the outside diameter of first tubing section 14. The outside surface of rigid member 12 includes first tubing interface 21, sleeve interface 23, and second tubing interface 25.

First tubing interface 21 includes first end 22 and first shoulder 24, which is adjacent to maximum outer diameter 15. First end 22 has a diameter sized so as to closely fit within first tubing section 14. First end 22 is inserted into first tubing section 14 such that the end of the first tubing section 14 is disposed in close relation to first shoulder 24, enabling weld 26 to be formed between rigid member 12 and first tubing section 14. Weld 26 prohibits axial and radial movement of first tubing section 14 relative to rigid member 12.

Sleeve interface 23 is on the opposite end of rigid member 12 from first tubing interface 21. Sleeve interface 23 includes crimping groove 18, second end 28, and shoulder 19. Sleeve interface 23 has a diameter sized so as to fit in close relationship with the interior of sleeve 16. Second end 28 is inserted into sleeve 16 such that one end of the sleeve 16 is disposed in close relation to shoulder 19, enabling weld 30 to be formed between rigid member 12 and sleeve 16. Weld 30 prohibits axial and radial movement of sleeve 16 relative to rigid member 12. Crimping groove 18 extends continuously, or discontinuously, around the perimeter of rigid member 12 and is positioned axially along rigid member 12 so that sleeve 16 covers the crimping groove 18 when the sleeve 16 is welded to the rigid member 12.

Figure 2:
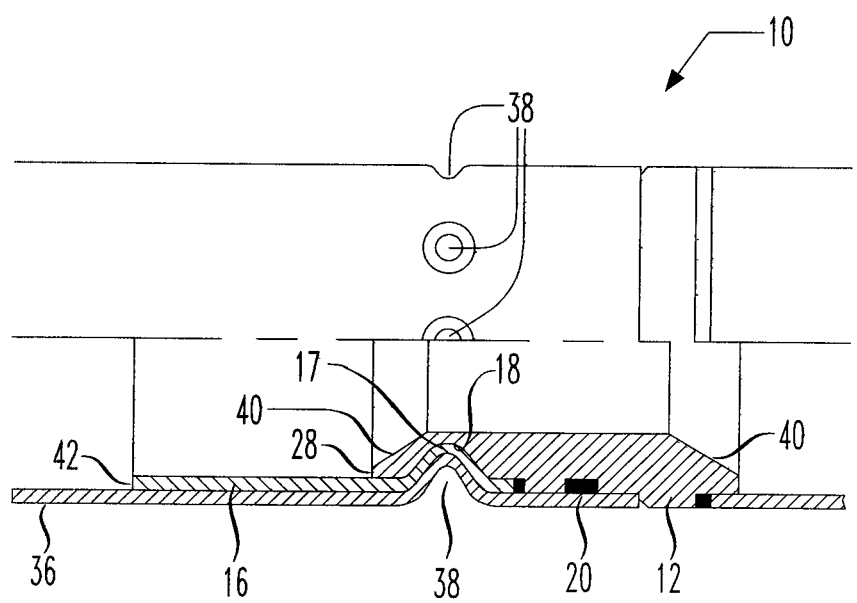
FIG. 2 is a partial sectional view of a coiled tubing connector engaged with a tubing section.

Second tubing interface 25 is located between sleeve interface 23 and first tubing interface 21 and includes seal groove 32 and shoulder 34. Second tubing interface 25 has an outer diameter approximately equal to the outer diameter of sleeve 16. Second tubing interface 25 continues axially from shoulder 19 to shoulder 34, where the diameter increases to maximum diameter 15. The diameter of second tubing interface 25 is sized so as to fit within, and in close relationship with the inner diameter of, a second tubing section 36, as shown in FIG. 2.

Rigid member 12 is constructed from a material suitable for use with the coiled tubing string. Rigid member 12 may be constructed from metallic materials, such a steel, stainless steel, high-chrome steel, or other machinable, weldable material. The inside diameter of rigid member 12, which forms flow passage 13, may include sloped ends 40 where the diameter gradually increases in order to provide a smooth transition and eliminate any internal ledges. The overall length of rigid member 12 is minimized so as to reduce the stiffness of connector 10. As the length of rigid member 12 increases, the stiffness of connector 10 and the stress developed in the coiled tubing string also increase.

Sleeve 16 is a relatively thin walled tubular member that is constructed from a material suitable for use with the coiled tubing string. Sleeve 16 has an outer diameter sized so as to fit in close relationship with the inner diameter of second tubing section 36, as shown in FIG. 2. The outside surface of sleeve 16 may have a longitudinal groove so as to accommodate a weld seam projecting from the inside surface of second tubing section 36. End 42 of sleeve 16 may also be sloped so as to provide a smooth transition between the inner diameters of second tubing section 36 and rigid member 12.

Sleeve 16 may be extended past the end of rigid member 12 in order to provide support to second tubing section 36. As the coiled tubing string and connector 10 are spooled on a reel or run over a gooseneck, the bending stresses imparted on the coiled tubing string will tend to create stress concentrations in second tubing section 36 immediately adjacent to connector 10. Sleeve 16 operates to decrease these stress concentrations and increase the useful life of the coiled tubing string.

Seal 20 is disposed within seal groove 32 positioned within second tubing interface 25. As shown in FIG. 2, seal 20 engages the inner wall of second tubing section 36. Seal 20 is a static, permanent seal that may be constructed of any seal material that is compatible with the environments in which the coiled tubing string may be used. For example, seal 20 may be constructed from an elastomeric material, such as nitrile rubber, or a polymeric seal material, such as VITON™ or PEEK™. Seal 20 may include a combination of seal members and backup members as necessary to meet the sealing requirements of the system.

Referring now to FIG. 2, connector 10 is shown engaged with a second tubing section 36. Sleeve 16 and second end 28 are inserted into second tubing section 36 such that one end of the second tubing section 36 is adjacent to shoulder 34. The outer diameter of second tubing section 36 closely matches the maximum outer diameter 15 of rigid member 12 and the outer diameter of first tubing section 14, such that the outer diameter remains substantially constant across connector 10.

A series of dimples 38 are formed in second tubing section 36 by applying a localized force to plastically deform second tubing section and push a small area of the tubing section 36 wall and sleeve 16 into engagement with crimping groove 18. Thus, by forming dimples 38 in the second tubing section 36, dimples 17 are also created in sleeve 16. Dimples 38 may be formed by pins, or some other member, being pushed against tubing section 36 by hydraulic or mechanical force. The pins may be axially located by a jig, or other structure, that can be temporarily attached to connector 10 so as to reliably align the pins with crimping groove 18. Dimples 38 can be placed at any desired radial location on the perimeter of second tubing section 36, and do not require radial alignment within crimping groove 18. The number of dimples 38 required will depend on the size of connector 10 and the axial loads for which the coiled tubing string is rated.

Dimples 38 engage crimping groove 18 and prohibit axial movement of rigid member 12 relative to second tubing section 36. Dimples 38 also prohibit axial and rotational movement of second tubing section 36 relative to sleeve 16, which is connected to rigid member 12 by weld 30. As discussed above, weld 30 prohibits axial and rotational movement of sleeve 16 relative to rigid member 12. Therefore, second tubing section 36 is prohibited from axial and rotational movement relative to rigid member 12. Axial and rotational movement of rigid member 12 relative to first tubing section 14 is prohibited by weld 26. Therefore, axial and rotational movement of first tubing section 14 relative to second tubing section 36 is prohibited by rigid member 12 of connector 10.

Referring now to FIG. 3, a coiled tubing connector 44 is shown including two connectors 10 connected by a flexible tubing section 46. Each connector 10 has a rigid member 12 with a corresponding sleeve 16, crimping groove 18, and seal 20, as described previously. Connector 44 may be used to connect two lengths of coiled tubing to effectively create a longer string of tubing with the same pressure and tensile load characteristics of the component strings, without the need for welding at the job site.

Flexible tubing section 46 is constructed from a material having a diameter, length, and wall thickness selected so as to provide a desired amount of flexibility between rigid members 12. This flexibility allows connector 44 to bend as the coiled tubing string is being spooled onto a reel or being run over the gooseneck. Flexible tubing section 46 may be a section of coiled tubing similar to the coiled tubing strings with which connector 44 will be employed. Alternatively, flexible tubing section 46 may be some other material selected for its flexibility and performance under repeated bending loads. In one embodiment, flexible tubing section 46 has an outside diameter no larger than the outside diameter of the coiled tubing string with which it is used.

FIG. 4 illustrates an alternate embodiment of a connector 48 including a rigid member 50 having multiple crimping grooves 52 and redundant seals 54. Sleeve 56 covers each of crimping grooves 52. Multiple crimping grooves 52 may be utilized in certain applications requiring connector 48 to withstand higher axial and rotational loads. Multiple seals 54 may be utilized in certain applications where sealing redundancy and reliability are especially valuable. The overall length of rigid member 50 is still minimized so as to reduce the stiffness of connector 48.

Connectors for coiled tubing as described above may find use in many tubing applications. These types of connectors could be used to join two lengths of tubing or to provide end connectors for connecting the tubing to a bottom hole assembly, or some other component. Connectors such as those described could also find use in other tubing applications outside of coiled tubing.

While representative embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the coiled tubing connector apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A tubing connector comprising:
   a rigid member having a first end and a second end;
   a crimping groove disposed about the rigid member;
   a first section of tubing fixably attached to the first end of the rigid member;
   a sleeve fixably attached to the rigid member, wherein the sleeve covers the crimping groove;
   a second section of tubing disposed over the sleeve; and
   a plurality of dimples in the second section of tubing and the sleeve, wherein the dimples project into the crimping groove.

2. The tubing connector of claim 1 further comprising a seal disposed about the rigid member between the first end of the rigid member and the crimping groove.

3. The tubing connector of claim 2 wherein the second section of tubing engages the seal.

4. The tubing connector of claim 1 wherein the sleeve extends beyond the second end of the rigid member.

5. A tubing connector comprising:
   a rigid member having a first end and a second end;
   a crimping groove disposed about the rigid member;
   a first section of tubing fixably attached to the first end of the rigid member;
   a sleeve fixably attached to the rigid member, wherein the sleeve covers the crimping groove; and
   a second section of tubing disposed over the sleeve, wherein the sleeve and the first section of tubing are welded to the rigid member.

6. A tubing connector comprising:
   a rigid member having a first end and a second end;
   a crimping groove disposed about the rigid member;
   a first section of tubing fixably attached to the first end of the rigid member;
   a sleeve fixably attached to the rigid member, wherein the sleeve covers the crimping groove;
   a second section of tubing disposed over the sleeve;
   a second rigid member having a first end and a second end, wherein the first end is fixably attached to the first tubing section;
   a second crimping groove disposed about the second rigid member; and
   a second sleeve fixably attached to the second rigid member and covering the second crimping groove.

7. The tubing connector of claim 6 further comprising:
   a third section of tubing; and
   a plurality of dimples in the third section of tubing and the second sleeve, wherein the dimples project into the second crimping groove.

8. The tubing connector of claim 7 further comprising:
   a first seal disposed about the rigid member between the first end of the rigid member and the crimping groove; and
   a second seal disposed about the second rigid member between the first end of the second rigid member and the second crimping groove.

9. The tubing connector of claim 8 wherein the second section of tubing engages the first seal and the third section of tubing engages the second seal.

10. A tubing connector comprising:
    a flexible tubing section having first and second ends;
    a first rigid member fixably attached to the first end of the flexible tubing section, wherein the first rigid member comprises at least one crimping groove;
    a first sleeve fixably attached to the first rigid member, wherein the first sleeve covers the at least one crimping groove on the first rigid member;
    a second rigid member fixably attached to the second end of the flexible tubing section, wherein the second rigid member comprises at least one crimping groove;
    a second sleeve fixably attached to the second rigid member, wherein the second sleeve covers the at least one crimping groove on the second rigid member;
    a first section of tubing disposed about the first sleeve and sealingly engaging the first rigid member; and
    a plurality of dimples formed by plastically deforming the first section of tubing and the first sleeve, wherein the plurality of dimples project into the crimping groove on the first rigid member.

11. The tubing connector of claim 10 wherein the first sleeve extends into the first section of tubing past the first rigid member.

12. The tubing connector of claim 10 further comprising:
    a second section of tubing disposed about the second sleeve and sealingly engaging the second rigid member; and
    a plurality of dimples formed by plastically deforming the second section of tubing and the second sleeve, wherein the plurality of dimples project into the crimping groove on the second rigid member.

13. The tubing connector of claim 12 wherein the second sleeve extends into the second section of tubing past the second rigid member.

14. A method for connecting a tubing section to a rigid member, comprising:
    fixably attaching a sleeve over one end of the rigid member to cover a crimping groove disposed on the rigid member; wherein the sleeve extends past the one end of the rigid member;
    disposing the tubing section over the sleeve;
    plastically deforming the tubing section and sleeve to form a plurality of dimples that project into the crimping groove of the rigid member;
    fixably attaching one end of a second tubing section to the other end of the rigid member; and
    fixably attaching the other end of the second tubing section to one end of a second rigid member.

15. The method of claim 14 wherein the second tubing section is attached to the rigid member by welding.

16. The method of claim 14 further comprising sealingly engaging the rigid member and the tubing section.

17. The method of claim 14 further comprising:
    fixably attaching a second sleeve over the other end of the rigid member to cover a crimping groove disposed on the second rigid member;
    disposing a third tubing section over the second sleeve; and
    plastically deforming the third tubing section and second sleeve to form a plurality of dimples that project into the crimping groove of the second rigid member.

18. The method of claim 17 further comprising:
    sealingly engaging the rigid member and the tubing section; and
    sealingly engaging the second rigid member and the third tubing section.

* * * * *